(12) United States Patent
Strazzieri et al.

(10) Patent No.: US 8,169,241 B2
(45) Date of Patent: May 1, 2012

(54) PROPORTIONAL PHASE COMPARATOR AND METHOD FOR PHASE-ALIGNING DIGITAL SIGNALS

(75) Inventors: Franck Strazzieri, Auriol (FR); Florent Garcia, Fuveau (FR)

(73) Assignee: Atmel Rousset S.A.S., Rousset Cedez (FR)

( * ) Notice: Subject to any disclaimer, the term of this patent is extended or adjusted under 35 U.S.C. 154(b) by 66 days.

(21) Appl. No.: 12/532,814

(22) PCT Filed: Jan. 15, 2008

(86) PCT No.: PCT/IB2008/001387
§ 371 (c)(1),
(2), (4) Date: Sep. 23, 2009

(87) PCT Pub. No.: WO2009/090448
PCT Pub. Date: Jul. 23, 2009

(65) Prior Publication Data
US 2010/0085091 A1    Apr. 8, 2010

(51) Int. Cl.
*H03L 7/06*    (2006.01)
(52) U.S. Cl. ..................... 327/156; 327/147
(58) Field of Classification Search ........... 327/147–158
See application file for complete search history.

(56) References Cited

U.S. PATENT DOCUMENTS

| 4,169,213 | A |  | 9/1979 | Dye et al. |
| 4,426,734 | A |  | 1/1984 | Tults et al. |
| 5,144,254 | A |  | 9/1992 | Wilke |
| 5,267,182 | A |  | 11/1993 | Wilke |
| 5,267,189 | A |  | 11/1993 | Wilke |
| 5,442,315 | A |  | 8/1995 | Hutchins |
| 5,614,855 | A |  | 3/1997 | Lee et al. |
| 5,811,999 | A | * | 9/1998 | Hall et al. ............ 327/156 |
| 5,838,180 | A |  | 11/1998 | Partyka |
| 5,907,253 | A | * | 5/1999 | Davis et al. ............ 327/156 |
| 6,137,995 | A |  | 10/2000 | Durec et al. |
| 6,320,435 | B1 |  | 11/2001 | Tanimoto |
| 6,420,916 | B1 |  | 7/2002 | Freeman |
| 6,670,855 | B2 |  | 12/2003 | Sumi |
| 6,731,908 | B2 |  | 5/2004 | Berliner et al. |
| 7,002,415 | B2 | * | 2/2006 | Tsyrganovich ............ 331/1 R |
| 7,079,616 | B2 |  | 7/2006 | Castiglione et al. |
| 7,091,795 | B1 | * | 8/2006 | Tsyrganovich ............ 331/1 R |
| 7,109,764 | B2 | * | 9/2006 | Sakamoto et al. ........ 327/156 |
| 7,206,370 | B2 | * | 4/2007 | Nakao .................... 375/376 |

(Continued)

OTHER PUBLICATIONS

"International Application Serial No. PCT/IB2008/001387, Search Report and Written Opinion mailed Aug. 12, 2009" 10 pages.

(Continued)

*Primary Examiner* — Lincoln Donovan
*Assistant Examiner* — Adam Houston
(74) *Attorney, Agent, or Firm* — Fish & Richardson P.C.

(57) ABSTRACT

Embodiments of a proportional phase comparator and method for aligning digital signals are generally described herein. In some embodiments, circuitry to align digital signals comprises a proportional phase comparator that generates triangular-shaped pulses for application to a charge pump. The triangular-shaped pulses may reduce an amount of charge injection in the charge pump close to convergence.

17 Claims, 6 Drawing Sheets

U.S. PATENT DOCUMENTS

| | | | |
|---|---|---|---|
| 7,236,757 B2 | 6/2007 | Raghavan et al. | |
| 7,254,201 B2 | 8/2007 | Kim | |
| 7,295,623 B2 | 11/2007 | Raghavan | |
| 7,315,594 B2 * | 1/2008 | Schmatz et al. | 375/355 |
| 7,336,110 B1 * | 2/2008 | Payrard et al. | 327/131 |
| 2004/0086002 A1 | 5/2004 | Dally et al. | |
| 2006/0226896 A1 * | 10/2006 | Dosho et al. | 327/554 |
| 2007/0114986 A1 | 5/2007 | Yoshii | |
| 2007/0210842 A1 | 9/2007 | Kawamoto | |

OTHER PUBLICATIONS

Wikipedia, Triangular Function [online], Jul. 13, 2011 [retrieved on Nov. 30, 2011]. Retrieved from the Internet: <http://en.wikipedia.org/wiki/Triangular_function>, 2 pages.

Wikipedia, Triangular Ramp function [online], Nov. 17, 2011 [retrieved on Nov. 30, 2011]. Retrieved from the Internet: <http://en.wikipedia.org/wiki/Ramp_function>, 3 pages.

* cited by examiner

180
PROPORTIONAL PHASE COMPARATOR AND METHOD FOR PHASE-ALIGNING DIGITAL SIGNALS

RELATED APPLICATION

This application is a U.S. National Stage Filing under 35 U.S.C. 371 from International Patent Application Serial No. PCT/IB2008/001387, filed Jan. 15, 2008, and published on Jul. 23, 2009 as WO 2009/090448 A2, the content of which is incorporated herein by reference in its entirety.

TECHNICAL FIELD

Some embodiments pertain to circuitry for phase-aligning digital signals, including delay-line loops (DLLs) and phase-locked loops (PLLs). Some embodiments pertain to clock and data recovery circuitry for use in phase-aligning transitions in data received over a high-speed data link, such as a universal serial bus (USB).

BACKGROUND

Circuitry for generating a stable reference frequency as well as circuitry for phase-aligning digital signals conventionally uses a feedback loop that includes a phase comparator and charge pump. The charge pump generates a current or other control signal based on a phase difference between two input signals. One issue with these conventional circuits is that internal mismatches, parasitics and noise, among other things, may cause non-linearities and skew the output due to charge injection in the charge pump, particularly when the phase approaches zero.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1A:
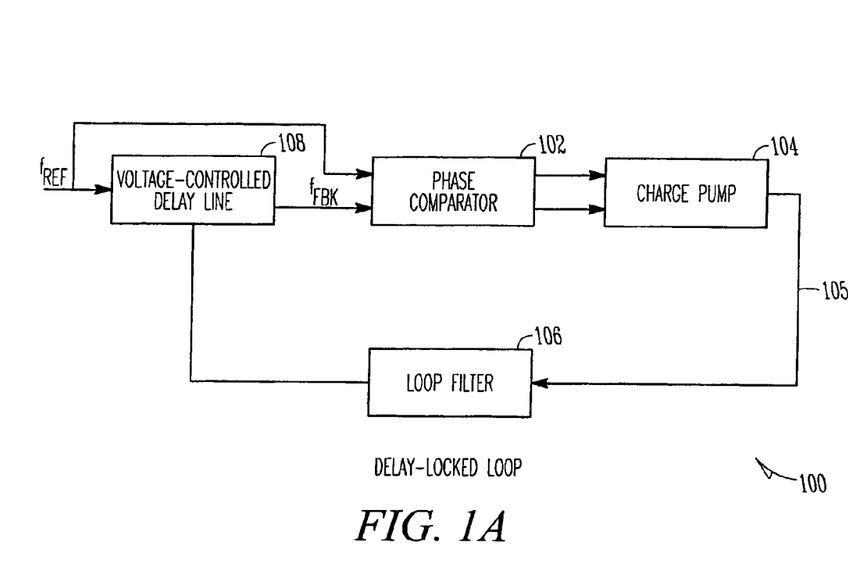
FIG. 1A is a block diagram of a delay-line loop (DLL) in accordance with some embodiments.

FIG. 1A is a block diagram of a delay-line loop (DLL) in accordance with some embodiments. DLL 100 may be used to phase-align transitions between a reference signal and an input signal, which may be a delayed version of the reference signal. DLL 100 includes proportional phase comparator 102, charge pump 104, loop filter 106, and delay line 108. Proportional phase comparator 102 may generate triangular-shaped pulses for application to charge pump 104. The generation of triangular-shaped pulses may reduce the amount of charge injection in charge pump 104 as well as reduce the slope of the output characteristic close to convergence of the phases of the input and reference signals. This is discussed in more detail below. As used herein, the term "triangular-shaped pulses" refers to pulses having a substantially triangular shape, which may include pulses having substantially linear or curved rising and/or falling edges.

Charge pump 104 provides output current 105 in response to the triangular-shaped pulses provided by proportional phase comparator 102. Loop filter 106 may integrate the output of charge pump 104 to generate a control signal (e.g., a control voltage) for controlling the delay implemented by delay line 108.

Delay line 108 may be a voltage controlled delay line, although the scope of the embodiments is not limited in this respect. In some embodiments, delay line 108 may comprise a plurality of delay stages that may provide a plurality of corresponding phases. The phases may be used, for example, by clock and data recovery (CDR) circuitry, as discussed below. In some embodiments, delay line 108 may include eight buffers controlled by the output voltage of charge pump 104, although the scope of the embodiments is not limited in this respect.

In some embodiments, proportional phase comparator 102 may be configured to concurrently generate two opposite triangular-shaped pulses even when the phase difference between reference signal ($f_{REF}$) and feedback signal ($f_{FBK}$) is at or near zero. In these embodiments, proportional phase comparator 102 may be configured to concurrently generate two opposite triangular-shaped pulses regardless of the phase difference between reference signal ($f_{REF}$) and feedback signal ($f_{FBK}$). Charge pump 104 may generate output current 105 in relation to a ratio between the sizes of the opposite triangular-shaped pulses. These embodiments are described in more detail below. With the exception of proportional phase comparator 102 and charge pump 104, DLL 100 may operate similar to a conventional DLL.

Figure 1B:
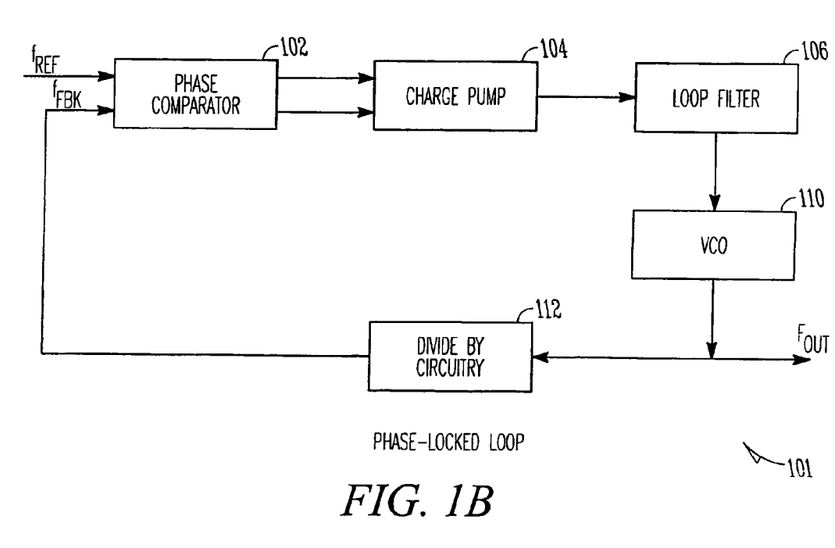
FIG. 1B is a block diagram of a phase-locked loop (PLL) in accordance with some embodiments.

FIG. 1B is a block diagram of a phase-locked loop (PLL) in accordance with some embodiments. PLL 101 may be used to generate a stable reference frequency and may include proportional phase comparator 102, charge pump 104, loop filter 106, voltage-controlled oscillator (VCO) 110, and divide by circuitry 112. As discussed above, proportional phase comparator 102 may be configured to generate triangular-shaped pulses to help reduce the amount of charge injection as well as to reduce the slope of the output characteristic of charge pump 104 close to convergence of an input and a reference signal.

In PLL 101, the output frequency ($F_{out}$) of VCO 110 may be controlled by loop filter 106 and may be divided by divide by circuitry 112 and provided to proportional phase comparator 102 as feedback signal ($f_{FBK}$) for comparison to reference signal ($f_{REF}$). With the exception of proportional phase comparator 102 and charge pump 104, PLL 101 may operate similar to a conventional PLL.

Figure 2:
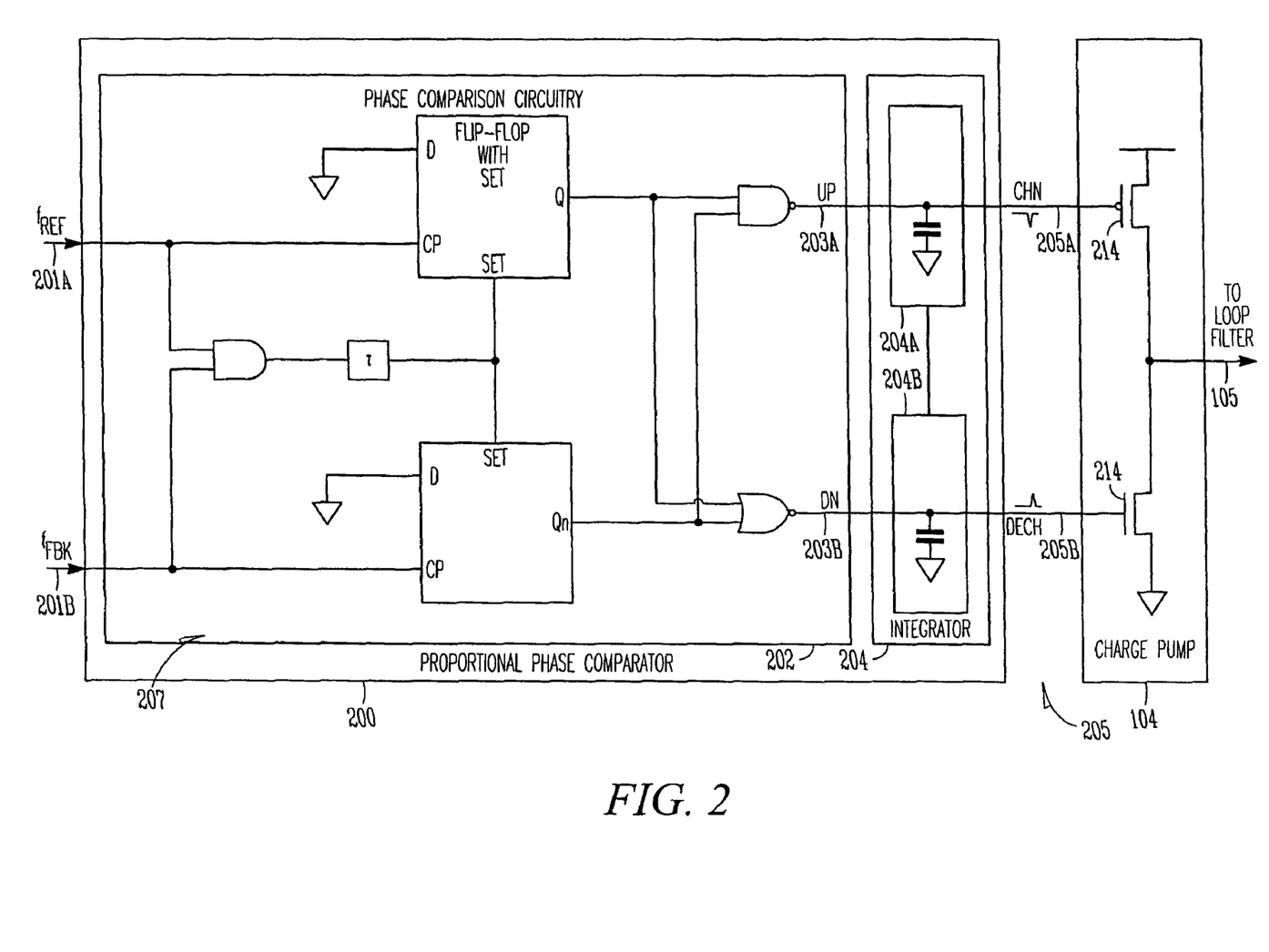
FIG. 2 illustrates a proportional phase comparator and a charge pump in accordance with some embodiments.

FIG. 2 illustrates a proportional phase comparator and a charge pump in accordance with some embodiments. Proportional phase comparator 200 may be suitable for use as proportional phase comparator 102 (FIG. 1A and FIG. 1B), although other proportional phase comparators may also be suitable. As illustrated in FIG. 2, proportional phase comparator 200 may comprise phase comparison circuitry 202 and integrator 204. Integrator 204 may integrate substantially-rectangular pulses 203A and 203B generated by phase comparison circuitry 202 to provide corresponding triangular-shaped pulses 205A and 205B. Phase comparison circuitry 202 may include logic circuitry 207 to generate substantially-rectangular pulses 203A and 203B based on a phase difference between reference signal ($f_{REF}$) 201A and feedback signal ($f_{FBK}$) 201B. Logic circuitry 207 may include one or more flop-flops and other logic circuit elements, an example of which is shown in FIG. 2.

Triangular-shaped pulses 205 may comprise triangular-shaped pulses 205A, which may be referred to as charge-not (CI-IN) pulses. Triangular-shaped pulses 205 may also comprise triangular-shaped pulses 205B, which may be referred to as de-charge (DECH) pulses. Substantially-rectangular pulses 203A may be referred to as "UP" control pulses and substantially-rectangular pulses 203B may be referred to as "DN" control pulses.

In some example embodiments, integrator 204 may comprise capacitive element 204A coupled between an output of phase comparison circuitry 202 and ground. Integrator 204 may also comprise capacitive element 204B coupled between the other output of phase comparison circuitry 202 and ground, although the scope of the embodiments is not limited in this respect. In some embodiments, integrator 204 may comprise R-C circuitry that includes resistive elements as well as capacitive elements, although other types of integration circuitry for integrating pulses may also be used. In some embodiments, integrator 204 may be calibrated and its components may be selected so that sufficient amplitude is produced to generate a small charge or discharge current by charge pump 104. This may reduce the amount of charge injection in charge pump 104 as well as reduce the slope of the output characteristic of the charge pump close to convergence.

In some example embodiments, charge pump 104 may comprise a pair of metal-oxide semiconductor (MOS) transistors 214 operating as switched current sources. In these embodiments, because the charge-injection effect is reduced by the application of triangular-shaped pulses 205 to the transistors of charge pump 104, a special or complex charge pump circuitry is not required, as is the case in many conventional feedback loops.

Figure 3A:
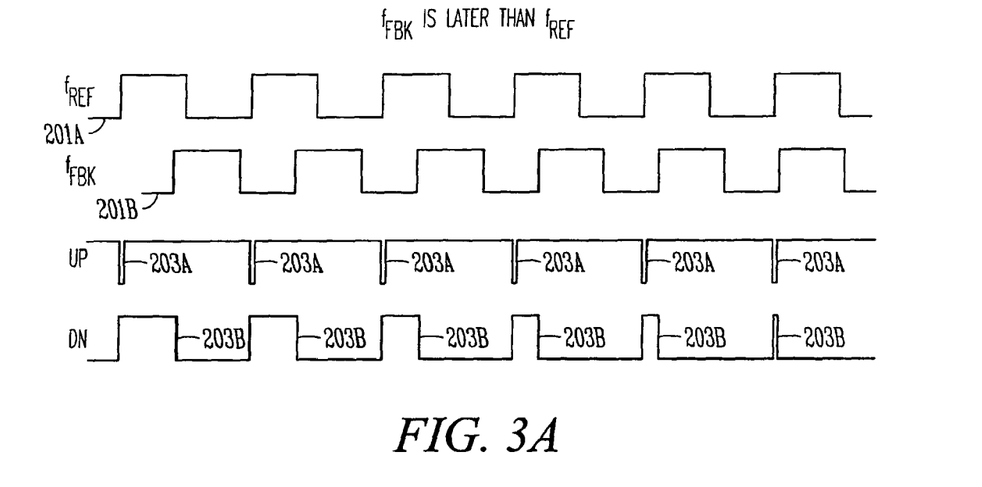
FIG. 3A illustrates the outputs of phase comparison circuitry when a feedback signal is later than a reference signal than in accordance with some embodiments.

FIG. 3A illustrates outputs of phase comparison circuitry 202 (FIG. 2) when a feedback signal is later than a reference signal in accordance with some embodiments. Feedback signal ($f_{FBK}$) 201B is initially delayed with respect to reference signal ($f_{REF}$) 201A. The widths of pulses 203B become shorter as feedback signal ($f_{FBK}$) 201B and reference signal ($f_{REF}$) 201A become synchronized and converge due to the operation of a feedback loop, such as the loop within DLL 100 (FIG. 1A) or PLL 101 (FIG. 1B).

Figure 3B:
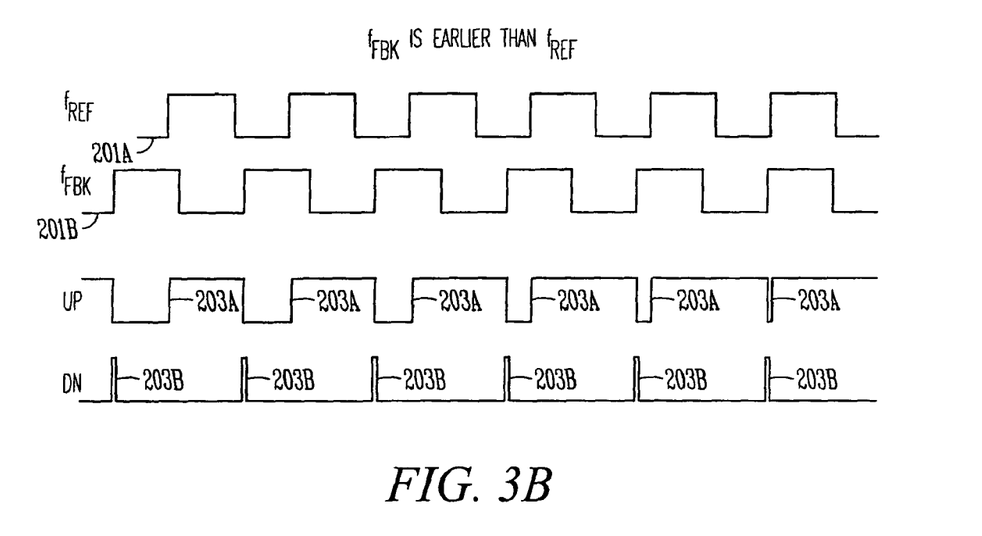
FIG. 3B illustrates the outputs of phase comparison circuitry when the feedback signal is earlier than the reference signal in accordance with some embodiments.

FIG. 3B illustrates outputs of phase comparison circuitry 202 (FIG. 2) when a feedback signal is earlier than a reference signal in accordance with some embodiments. Feedback signal ($f_{FBK}$) 201B is initially advanced with respect to reference signal ($f_{REF}$) 201A. The width of pulses 203A become shorter as feedback signal ($f_{FBK}$) 201B and reference signal ($f_{REF}$) 201A become synchronized and converge due to the operation of a feedback loop, such as the loop within DLL 100 (FIG. 1A).

In these embodiments illustrated in FIGS. 3A and 3B, a rising edge of reference signal ($f_{REF}$) 201A may cause a rising edge of pulse 203B and a falling edge of pulse 203A. A rising edge of feedback signal ($f_{FBK}$) 201B may cause a falling edge of pulse 203B and a rising edge of pulse 203A. In these embodiments, phase comparison circuitry 202 concurrently produces both "UP" control pulses 203A and "DN" control pulses 203B even when the phase difference between the reference and feedback signals is zero.

Figure 4A:
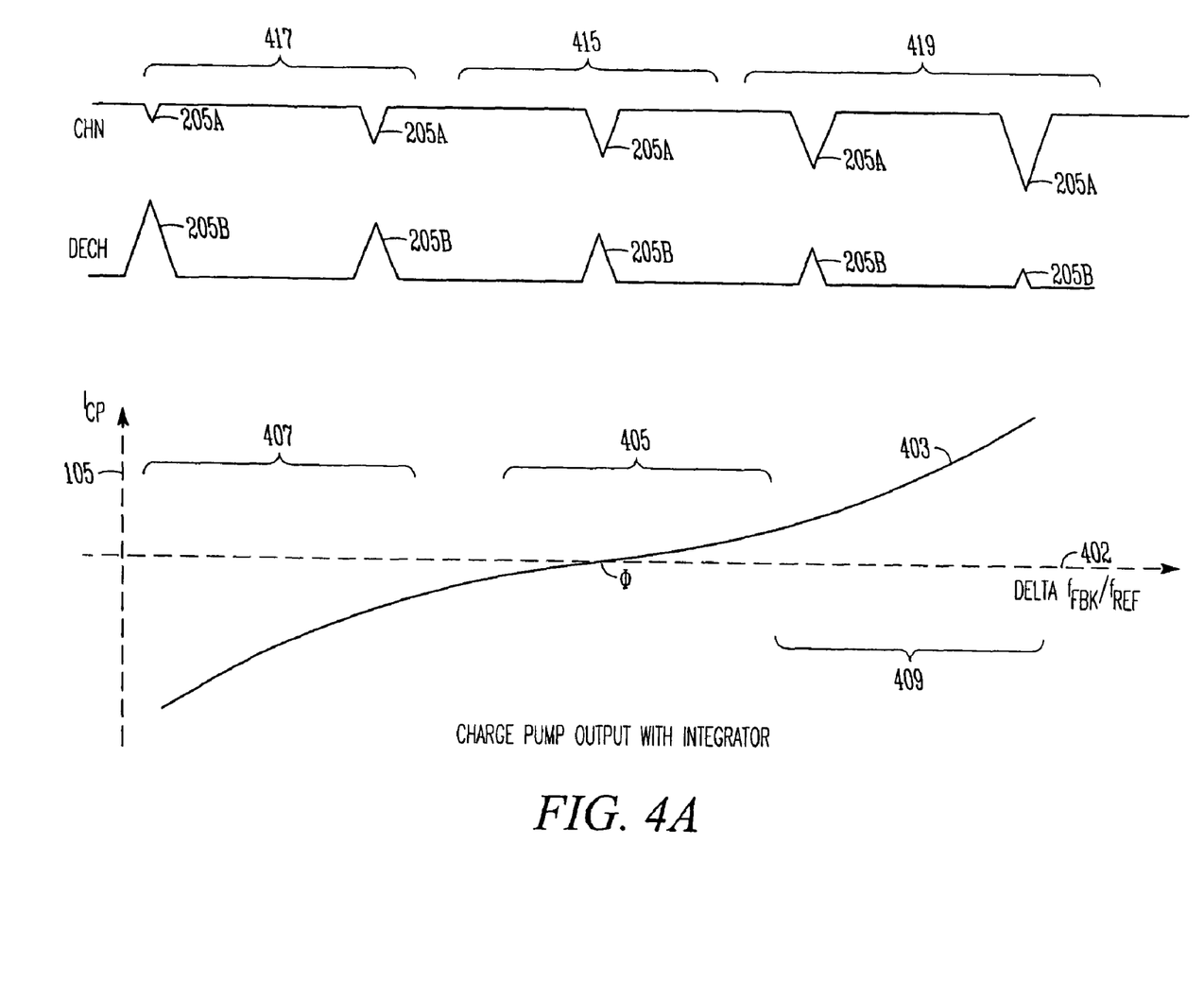
FIG. 4A illustrates triangular-shaped output pulses of a proportional phase comparator and corresponding charge pump output current in accordance with some embodiments.

FIG. 4A illustrates triangular-shaped output pulses of a proportional phase comparator and corresponding charge pump output current in accordance with some embodiments. Proportional phase comparator 200 (FIG. 2) generates two opposite triangular-shaped pulses 205A and 205B. In these embodiments, proportional phase comparator 200 may be configured to generate triangular-shaped pulses 205A and 205B having sizes (e.g., width and height) proportional to widths of substantially-rectangular pulses 203A and 203B generated by phase comparison circuitry 202, as shown in FIGS. 3A and 3B.

The size of opposite triangular-shaped pulses 205A and 205B may vary in accordance with the phase difference between reference signal ($f_{REF}$) 201A and feedback signal ($f_{FBK}$) 201B (FIGS. 3A and 3B). For example, as illustrated in FIG. 4A, triangular-shaped pulses 205A are smaller than triangular-shaped pulses 205B in region 417 when feedback signal ($f_{FBK}$) 201B is later than reference signal ($f_{REF}$) 201A. Triangular-shaped pulses 205A are larger than triangular-shaped pulses 205B in region 419 when feedback signal ($f_{FBK}$) 201B is earlier than the reference signal ($f_{REF}$) 201A. Triangular-shaped pulses 205A become about the same size as triangular-shaped pulses 205B in region 415 when feedback signal ($f_{FBK}$) 201B converges with reference signal ($f_{REF}$) 201A.

In these embodiments, proportional phase comparator 200 is configured to concurrently generate opposite triangular-shaped pulses 205A and 205B regardless of the phase difference between reference signal ($f_{REF}$) 201A and feedback signal ($f_{FBK}$) 201B. For example, proportional phase comparator 200 may generate opposite triangular-shaped pulses 205A and 205B even when the phase difference between reference signal ($f_{REF}$) 201A and feedback signal ($f_{FBK}$) 201B is substantially zero.

In further reference to FIG. 4A, charge pump 104 (FIG. 2) may generate output current ($I_{cp}$) 105 in relation 403 to a ratio 402 between the size of opposite triangular-shaped pulses 205A and 205B. The slope of relation 403 may decrease as the phase difference between reference signal 201A and feedback signal 201B approaches zero, as shown in region 405. The slope of relation 403 increases to a linear relation as the phase difference increases, as shown in regions 409 and 407. The decreased slope close to convergence allows proportional phase comparator 200 to be less sensitive to phase noise. The triangular-shaped pulses may provide charge pump 104 with sufficient amplitude to generate charge or discharge current thereby reducing charge injection in charge pump 104. Among other things, the decreased slope reduces jitter close to convergence and may increase the accuracy of the overall system by reducing any skew between the reference and feedback signals.

Figure 4B:
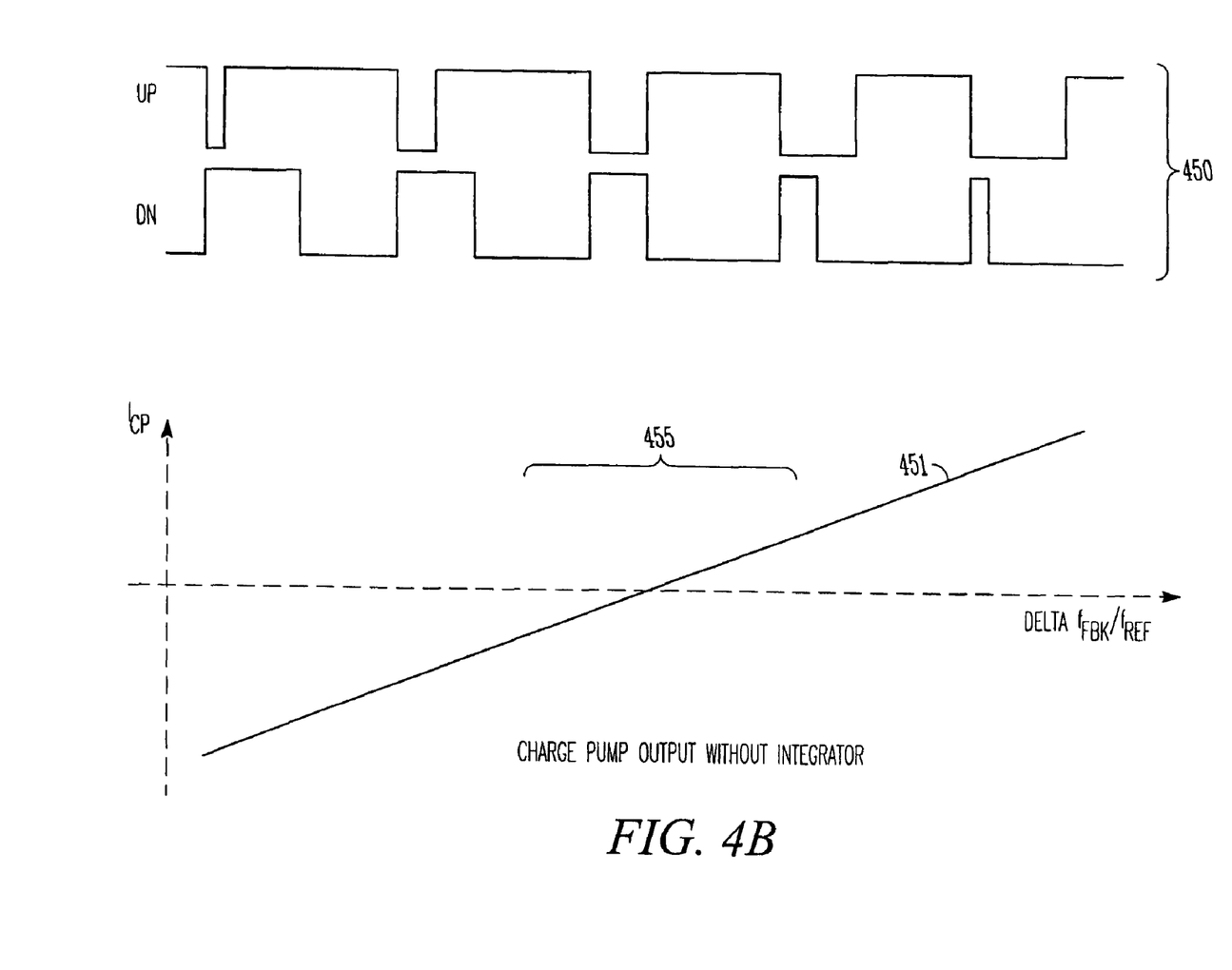
FIG. 4B illustrates output pulses of a conventional proportional phase comparator and corresponding charge pump output current.

FIG. 4B illustrates output pulses of a conventional proportional phase comparator and corresponding charge pump output current. A conventional proportional phase comparator provides square-wave outputs 450 from ground to supply proportional to the phase difference input signals. Square-wave outputs 450 comprise two output pulses (e.g., an "UP" and a "DN" pulse) that are opposite and proportional to the phase difference. Supplying these pulse outputs to a charge pump, such as charge pump 104 (FIG. 1A or 1B), may cause the charge pump to produce positive or negative pulses of current charge or discharge even when the phase difference between the input signals is zero.

In a conventional proportional phase comparator, these "UP" and "DN" pulses are generated as full-swing signals resulting in charge injection in the charge-pump that can disturb the linearity of the process, particularly when the phase difference between the inputs is very small. Due to the application of these full-swing signals, parasitic capacitances in the charge pump transistors, among other things, may cause charge injection resulting in current spikes and/or overshoot within the feedback loop. This may also produce VCO jitter. As shown in FIG. 4B, output relation 451 of a conventional proportional phase comparator coupled with a charge pump is linear near convergence, as shown in region 455.

Figure 5:
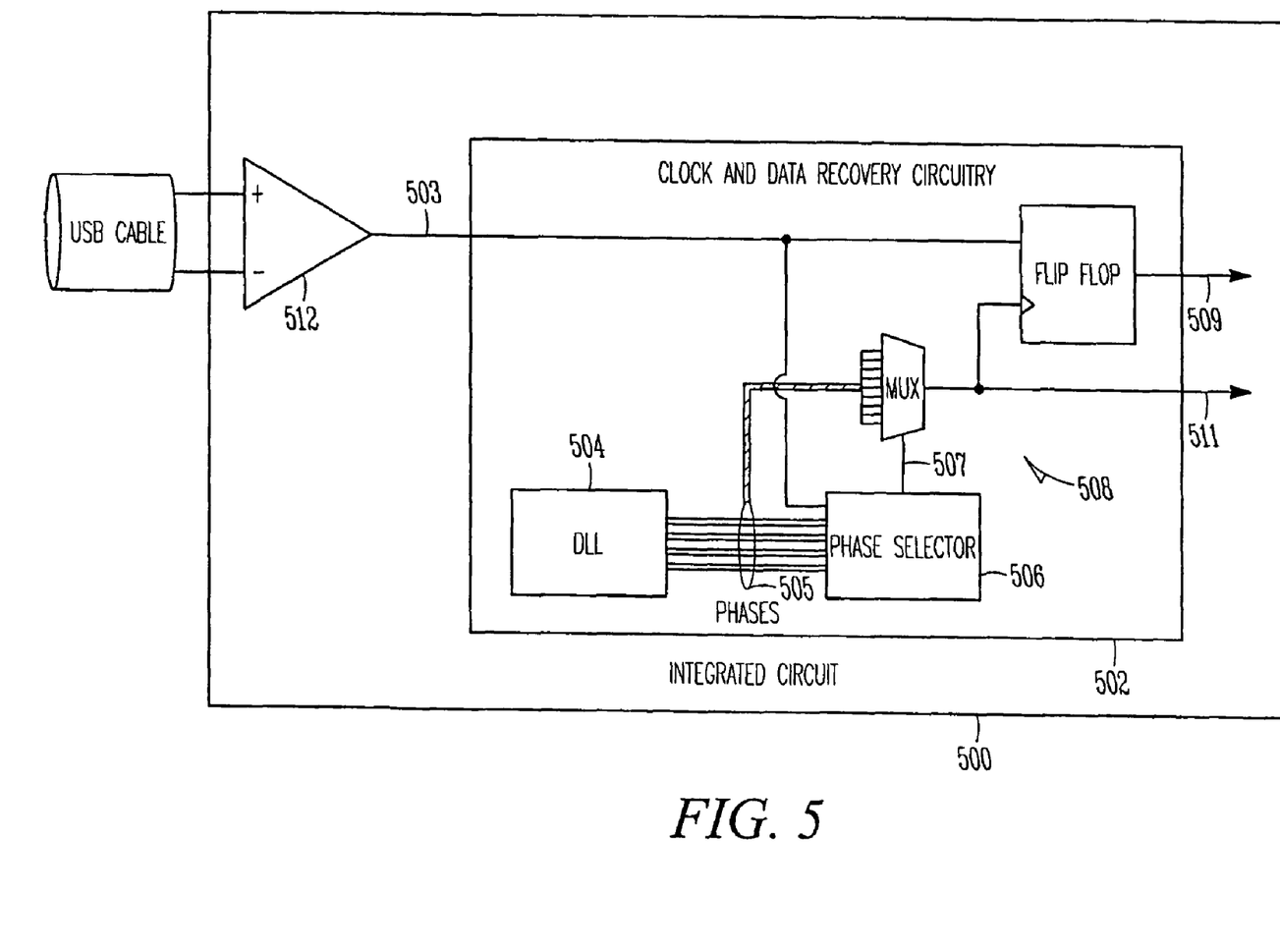
FIG. 5 illustrates an integrated circuit including clock and data recovery circuitry in accordance with some embodiments.

FIG. 5 illustrates an integrated circuit including clock and data recovery (CDR) circuitry in accordance with some embodiments. Integrated circuit 500 may include, among other things, CDR circuitry 502 and differential receiver 512. CDR circuitry 502 may comprise DLL 504, phase selector 506, and logic circuitry 508. DLL 504 may be configured to generate a plurality of phases 505. Phase selector 506 may select one of phases 505 based on received data signal 503 using phase-selection signal 507. Logic circuitry 508 may generate recovered data signal 509 and recovered clock signal 511 from the selected phase and received data signal 503. Logic circuitry 508 may include one or more flip-flops and a multiplexer (MUX), and example of which is illustrated in FIG. 5.

In accordance with some embodiments, DLL 100 (FIG. 1A) may be suitable for use as DLL 504, although the scope of the embodiments is not limited in this respect. In these embodiments, DLL 504 may comprise a proportional phase comparator, such as proportional phase comparator 200 (FIG. 2), to generate triangular-shaped pulses for application to a charge pump, such as charge pump 104. The triangular-shaped pulses may reduce an amount of charge injection in the charge pump, particularly when the DLL is close to convergence (e.g., phase alignment of the signals).

In some embodiments, received data signal 503 may be generated by differential receiver 512 from a high-speed serial data stream received over a high-speed data link, such as a USB cable or other source, although the scope of the embodiments are not limited in this respect. In these embodiments, the high-speed serial data stream may be sent without an accompanying clock. The clock may be regenerated from an approximate frequency reference and may be phase-aligned with the transitions in the data stream using DLL 504 as described above.

Although integrated circuit 500 and CDR circuitry 502 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of integrated circuit 500 and CDR circuitry 502 may refer to one or more processes operating on one or more processing elements.

The invention claimed is:

1. A circuit to align digital signals, the circuit comprising:
a proportional phase comparator configured to generate triangular-shaped pulses for application to a charge pump based on a phase difference between a reference signal and a feedback signal; and
the charge pump configured to provide an output current in response to the triangular-shaped pulses, wherein the output current is based on a ratio of a size of two opposite triangular-shaped pulses.

2. The circuit of claim 1, wherein the proportional phase comparator is configured to concurrently generate two opposite triangular-shaped pulses including when the phase difference between the reference signal and the feedback signal is at or near zero,
wherein the size of the two opposite triangular-shaped pulses varies in accordance with the phase difference between the reference and feedback signals.

3. The circuit of claim 1, wherein the charge pump generates the output current in a relation based on the ratio of the size of the two opposite triangular-shaped pulses,
wherein the relation has a decreased slope as the phase difference approaches zero, and
wherein the relation has an increased slope as the phase difference increases.

4. The circuit of claim 3, wherein the decreased slope reduces an amount of charge injection in the charge pump.

5. The circuit of claim 4, wherein the charge pump comprises metal-oxide semiconductor (MOS) transistors configured to operate as switched current sources.

6. The circuit of claim 1, wherein the proportional phase comparator comprises:
a phase comparison circuitry that is configured to generate substantially-rectangular pulses in response to the phase difference between the reference signal and the feedback signal; and
an integrator that is configured to integrate the substantially-rectangular pulses to provide the triangular-shaped pulses.

7. The circuit of claim 6, wherein the proportional phase comparator is configured to generate the triangular-shaped pulses having sizes proportional to widths of the substantially-rectangular pulses.

8. The circuit of claim 6, wherein the integrator comprises:
a first capacitive element coupled between a first output of the phase comparison circuitry and ground; and
a second capacitive element coupled between a second output of the phase comparison circuitry and ground.

9. The circuit of claim 6, wherein the proportional phase comparator is part of a delay-line loop of a clock and data recovery circuitry that is configured to phase align transitions in data received over a high-speed universal serial bus.

10. The circuit of claim 6, wherein the proportional phase comparator is part of a phase-locked loop.

11. A method for aligning digital signals comprising,
generating triangular-shaped pulses for application to a charge pump based on a phase difference between a reference signal and a feedback signal; and
providing an output current in response to the triangular-shaped pulses, wherein the output current is based on a ratio of a size of two opposite triangular-shaped pulses.

12. The method of claim 11, wherein generating the triangular-shaped pulses comprises concurrently generating two opposite triangular-shaped pulses including when the phase difference is at or near zero, and wherein the size of the two opposite triangular-shaped pulses varies in accordance with the phase difference between the reference and feedback signals.

13. The method of claim 12, wherein providing the output current comprises:
generating the output current in a relation based on the ratio of the size of the two opposite triangular-shaped pulses,
wherein the relation has a decreased slope as the phase difference approaches zero, and wherein the relation has an increased slope as the phase difference increases.

14. The method of claim 11, further comprising:
generating substantially-rectangular pulses in response to the phase difference between the reference and feedback signals; and
integrating the substantially-rectangular pulses to provide the triangular-shaped pulses.

15. The method of claim 14, comprising:
generating triangular-shaped pulses having sizes proportional to widths of the substantially-rectangular pulses.

16. The circuit of claim 1, wherein the triangular-shaped pulses are configured to reduce an amount of charge injection in the charge pump close to convergence.

17. The method of claim 11, wherein the triangular-shaped pulses are configured to reduce an amount of charge injection in the charge pump close to convergence.

* * * * *

UNITED STATES PATENT AND TRADEMARK OFFICE
CERTIFICATE OF CORRECTION

PATENT NO. : 8,169,241 B2  
APPLICATION NO. : 12/532814  
DATED : May 1, 2012  
INVENTOR(S) : Franck Strazzieri et al.

Page 1 of 1

It is certified that error appears in the above-identified patent and that said Letters Patent is hereby corrected as shown below:

On the title page: item (73) Assignee: please delete "Cedez" and insert therefor --Cedex--;

Column 1, line 9, please delete "PCT/1B2008/001387" and insert therefor --PCT/IB2008/001387--; and Column 6, line 57, claim 11, please delete "comprising," and insert therefor --comprising:--.

Signed and Sealed this
Tenth Day of July, 2012

David J. Kappos
*Director of the United States Patent and Trademark Office*